(12) United States Patent
Noguchi

(10) Patent No.: US 9,965,418 B2
(45) Date of Patent: May 8, 2018

(54) SEMICONDUCTOR DEVICE, SEMICONDUCTOR SYSTEM INCLUDING THE SAME, CONTROL METHOD OF SEMICONDUCTOR DEVICE, AND CHECK LIST GENERATION PROGRAM

(71) Applicant: Renesas Electronics Corporation, Tokyo (JP)

(72) Inventor: Koichiro Noguchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 87 days.

(21) Appl. No.: 15/098,148

(22) Filed: Apr. 13, 2016

(65) Prior Publication Data

US 2016/0364351 A1     Dec. 15, 2016

(30) Foreign Application Priority Data

Jun. 10, 2015    (JP) .................................. 2015-117558

(51) Int. Cl.
   *G06F 13/36* (2006.01)
   *G06F 13/40* (2006.01)

(52) U.S. Cl.
   CPC .......... *G06F 13/36* (2013.01); *G06F 13/4068* (2013.01)

(58) Field of Classification Search
   CPC ........... G06F 13/385; G06F 2213/0042; G06F 13/4045; G06F 2213/00; G06F 2213/0024; G06F 2213/0016; H04L 12/40123
   USPC ................................. 710/300–306, 104, 100
   See application file for complete search history.

(56) References Cited

U.S. PATENT DOCUMENTS

2006/0059325 A1*  3/2006  Milne ................. G06F 13/4081
                                                        711/200
2014/0089548 A1*  3/2014  Prusia .................... G06F 12/02
                                                        710/305

FOREIGN PATENT DOCUMENTS

JP        H 10-74169 A    3/1998

* cited by examiner

*Primary Examiner* — Glenn A. Auve
*Assistant Examiner* — Kim T Huynh
(74) *Attorney, Agent, or Firm* — McGinn IP Law Group, PLLC

(57) ABSTRACT

A semiconductor device is provided which can quickly detect a malfunction of high priority modules by frequently checking a coupling state between the high priority modules and a communication bus.

According to an embodiment, a host controller includes a module control circuit that performs data communication with a plurality of externally-provided modules through a communication bus, a coupling state check circuit which is coupled to the communication bus and which checks the presence or absence of a response from the modules, and selected from the modules based on information of a check list, and a control circuit that selectively causes the module control circuit and the coupling state check circuit to operate.

19 Claims, 14 Drawing Sheets

SEMICONDUCTOR DEVICE, SEMICONDUCTOR SYSTEM INCLUDING THE SAME, CONTROL METHOD OF SEMICONDUCTOR DEVICE, AND CHECK LIST GENERATION PROGRAM

CROSS-REFERENCE TO RELATED APPLICATIONS

The disclosure of Japanese Patent Application No. 2015-117558 filed on Jun. 10, 2015 including the specification, drawings and abstract is incorporated herein by reference in its entirety.

BACKGROUND

The present invention relates to a semiconductor device, a semiconductor system including a semiconductor device, a control method of a semiconductor device, and a check list generation program, for example, relates to a semiconductor device, a semiconductor system including a semiconductor device, a control method of a semiconductor device, and a check list generation program, which are suitable for quickly detecting a malfunction of a high priority module.

For data communication between a host controller and a module, an I2C (Inter-Integrated Circuit) method is widely used as a communication method. In the I2C communication, it is possible to couple a host controller with a plurality of modules through a communication bus, so that it is possible to reduce the number of signal lines.

Here, when a certain module is disconnected from the communication bus due to a vibration of a system or a tangling of signal lines (including a case in which the module is not disconnected in appearance but the module is electrically disconnected due to contact failure or the like) the host controller cannot perform data communication with the module. In other words, the module cannot be controlled. As a result, there is a possibility that the system malfunctions.

A solution to such a problem is disclosed in Japanese Unexamined Patent Application Publication No. Hei 10(1998)-74169. A distributed abnormality display device disclosed in Japanese Unexamined Patent Application Publication No. Hei 10(1998)-74169 includes a central processing unit, a plurality of input/output units, a bus that couples the central processing unit with the input/output units, and a cyclic check means that checks abnormality by periodically transmitting data for detecting abnormality to an abnormality detection means of each input/output unit. Thereby, the distributed abnormality display device can detect that each input/output unit is disconnected from the bus, so that it is possible to suppress malfunction of the system.

SUMMARY

A configuration disclosed in Japanese Unexamined Patent Application Publication No. Hei 10(1998)-74169 periodically checks abnormality of each of the input/output units. Specifically, the configuration sequentially checks a coupling state with the bus one by one for each of the input/output units (modules).

Therefore, when a module such as a motor, which requires a quick countermeasure for malfunction, (hereinafter referred to as a high priority module) and a module such as a sensor, which does not require a quick countermeasure for malfunction, (hereinafter referred to as a low priority module) coexist, the frequency of checking the coupling state between a high priority module and a communication bus is low. As a result, there is a problem that a malfunction of a high priority module cannot be quickly detected. Other objects and novel features will become apparent from the description of the present specification and the accompanying drawings.

According to an embodiment, a semiconductor device includes a communication circuit that performs data communication with a plurality of externally-provided modules through a bus, a check circuit that checks response content from one or a plurality of first modules which are coupled to the bus and are selected from the externally-provided modules based on information of a first check list, and a control circuit that selectively causes the communication circuit and the check circuit to operate.

According to an embodiment, a control method of a semiconductor device performs data communication with a plurality of externally-provided modules through a bus by using a communication circuit, checks response content from one or a plurality of first modules which are coupled to the bus and are selected from the externally-provided modules based on information of a first check list by using a check circuit, and selectively causes the communication circuit and the check circuit to operate.

According to an embodiment, a check list generation program causes a computer to execute processing that detects a plurality of modules coupled to a bus and processing that generates a first checklist including information of one or a plurality of first modules where a high priority is set among the modules.

According to an embodiment described above, it is possible to provide a semiconductor device, a semiconductor system including a semiconductor device, a control method of a semiconductor device, and a check list generation program, which can quickly detect a malfunction of a high priority module by frequently checking the presence or absence of a response from the high priority module.

DETAILED DESCRIPTION

Hereinafter, embodiments will be described with reference to the drawings. The drawings are schematic, so that it should not be construed to limit the technical scope of the embodiments based on the description of the drawings. The same components are denoted by the same reference symbols and the repetitive description thereof will be omitted.

The following embodiments will be explained, divided into plural sections or embodiments, if necessary for convenience. Except for the case where it shows clearly in particular, they are not mutually unrelated and one has relationships such as a modification, details, and supplementary explanation of some or entire of another. In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

Furthermore, in the following embodiments, an element (including an element step etc.) is not necessarily indispensable, except for the case where it is clearly specified in particular and where it is considered to be clearly indispensable from a theoretical point of view, etc. Similarly, in the following embodiments, when shape, position relationship, etc. of an element etc. is referred to, what resembles or is similar to the shape substantially shall be included, except for the case where it is clearly specified in particular and where it is considered to be clearly not right from a theoretical point of view. This statement also applies to the numeric value, etc. described above (including the number, a numeric value, an amount, a range, etc.).

First Embodiment

Figure 1:
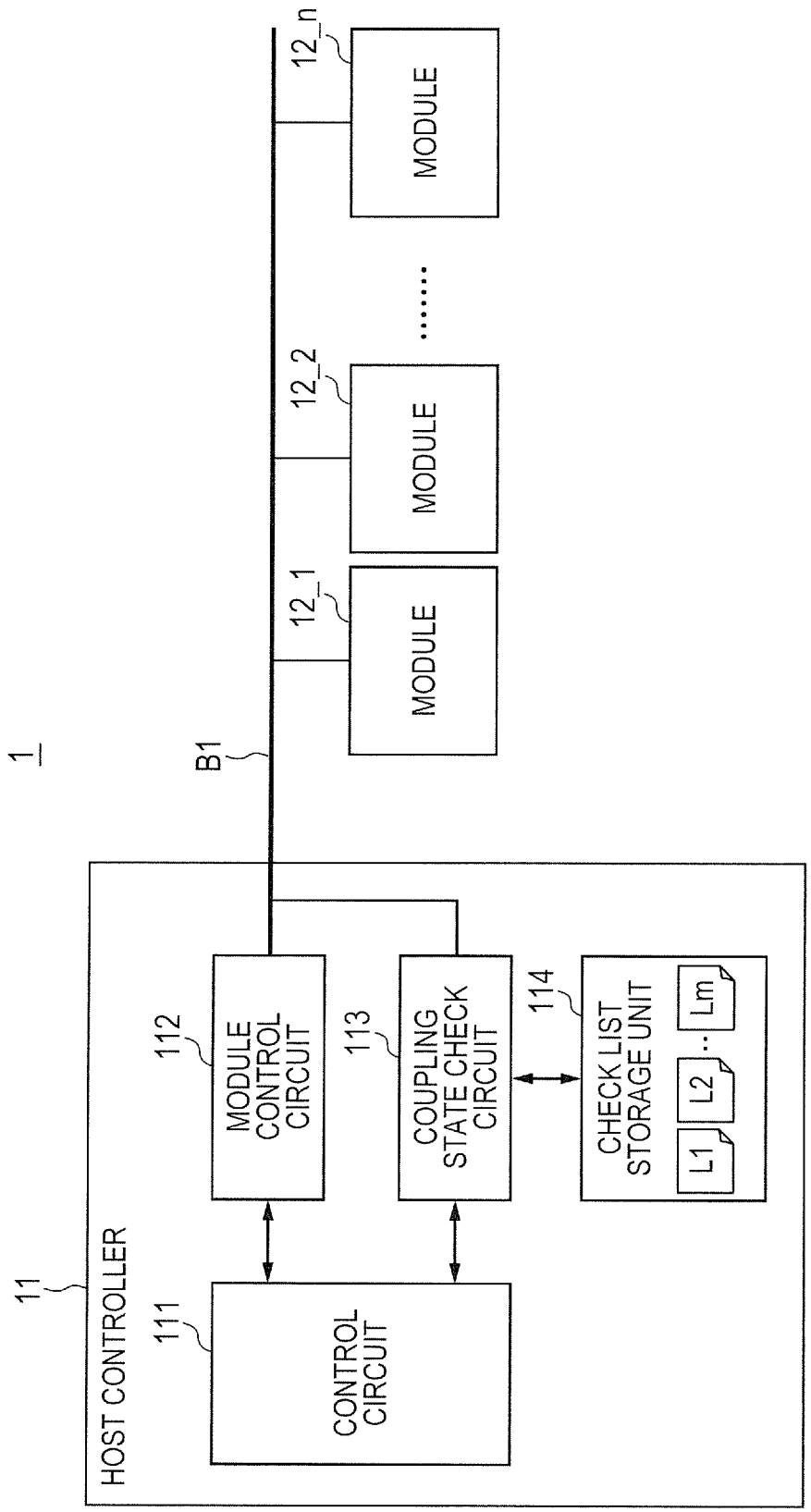
FIG. 1 is a block diagram showing a configuration example of a semiconductor system according to a first embodiment.

FIG. 1 is a block diagram showing a configuration example of a semiconductor system 1 according to a first embodiment. In the semiconductor system 1 according to the present embodiment, a host controller 11 preferentially checks a coupling state between a module selected from modules 12_1 to 12_n based on information of a check list L1 and a communication bus B1. Thereby, it is possible to frequently check high priority modules such as a motor, so that it is possible to quickly detect a malfunction of these high priority modules. Hereinafter, the first embodiment will be specifically described.

As shown in FIG. 1, the semiconductor system 1 includes a host controller (a semiconductor device) 11, modules 12_1 to 12_n (n is an integer greater than or equal to 2), and a communication bus B1 that couples the host controller 11 with the modules 12_1 to 12_n. Data communication is performed between the host controller 11 and the modules 12_1 to 12_n through the communication bus B1.

The communication bus B1 includes at least a clock signal line SCL and a data signal line SDA. In the present embodiment, a case in which an I2C method is employed as a data communication method between the host controller 11 and the modules 12_1 to 12_n will be described as an example. However, the data communication method between the host controller 11 and the modules 12_1 to 12_n is not limited to the I2C method, but another communication method in which half-duplex communication is performed through one communication bus may be employed.

The host controller 11 is formed of one or a plurality of chips and includes a control circuit 111, a module control circuit (a communication circuit) 112, a coupling state check circuit 113, and a check list storage unit 114.

The module control circuit 112 is a circuit that performs data communication with the modules 12_1 to 12_n through the communication bus B1.

The coupling state check circuit 113 is a circuit that checks whether or not the modules 12_1 to 12_n are coupled to the communication bus B1 (a circuit that checks a coupling state between the modules 12_1 to 12_n and the communication bus B1). For example, the coupling state check circuit 113 determines whether or not a module specified by an address signal is coupled to the communication bus B1 depending on the presence or absence of a response to transmission of the address signal.

Here, the coupling state check circuit 113 checks the coupling state after determining priority of the check of the coupling state between the modules 12_1 to 12_n and the communication bus B1 based on check lists L1 to Lm (m is an integer greater than or equal to 1) stored in the check list storage unit 114. The details of the check of the coupling state between the modules 12_1 to 12_n and the communication bus B1 will be described later.

The control circuit 111 is a circuit that selectively causes the module control circuit 112 and the coupling state check circuit 113 to operate. Communication is performed between the host controller 11 and the modules 12_1 to 12_n through one communication bus B1. In other words, the control circuit 111 cannot cause the module control circuit 112 and the coupling state check circuit 113 to operate at the same time. Therefore, the control circuit 111 causes the module control circuit 112 and the coupling state check circuit 113 to operate exclusively from each other.

For example, when the control circuit 111 performs data communication by using the module control circuit 112, the control circuit 111 stops the check of coupling state performed by the coupling state check circuit 113, and when the control circuit 111 performs the check of coupling state by using the coupling state check circuit 113, the control circuit 111 stops the data communication performed by the module control circuit 112.

Further, for example, when control circuit 111 detects a coupling failure of any of the modules by using the coupling state check circuit 113, the control circuit 111 performs predetermined processing such as stopping subsequent data communication to be performed by the module control circuit 112.

First Application Example of Semiconductor System 1

Subsequently, a first application example of the semiconductor system 1 will be described with reference to FIG. 2. In an example of FIG. 2, only a coupling state between a high priority module such as a motor and the communication bus B1 is frequently checked.

Figure 2:
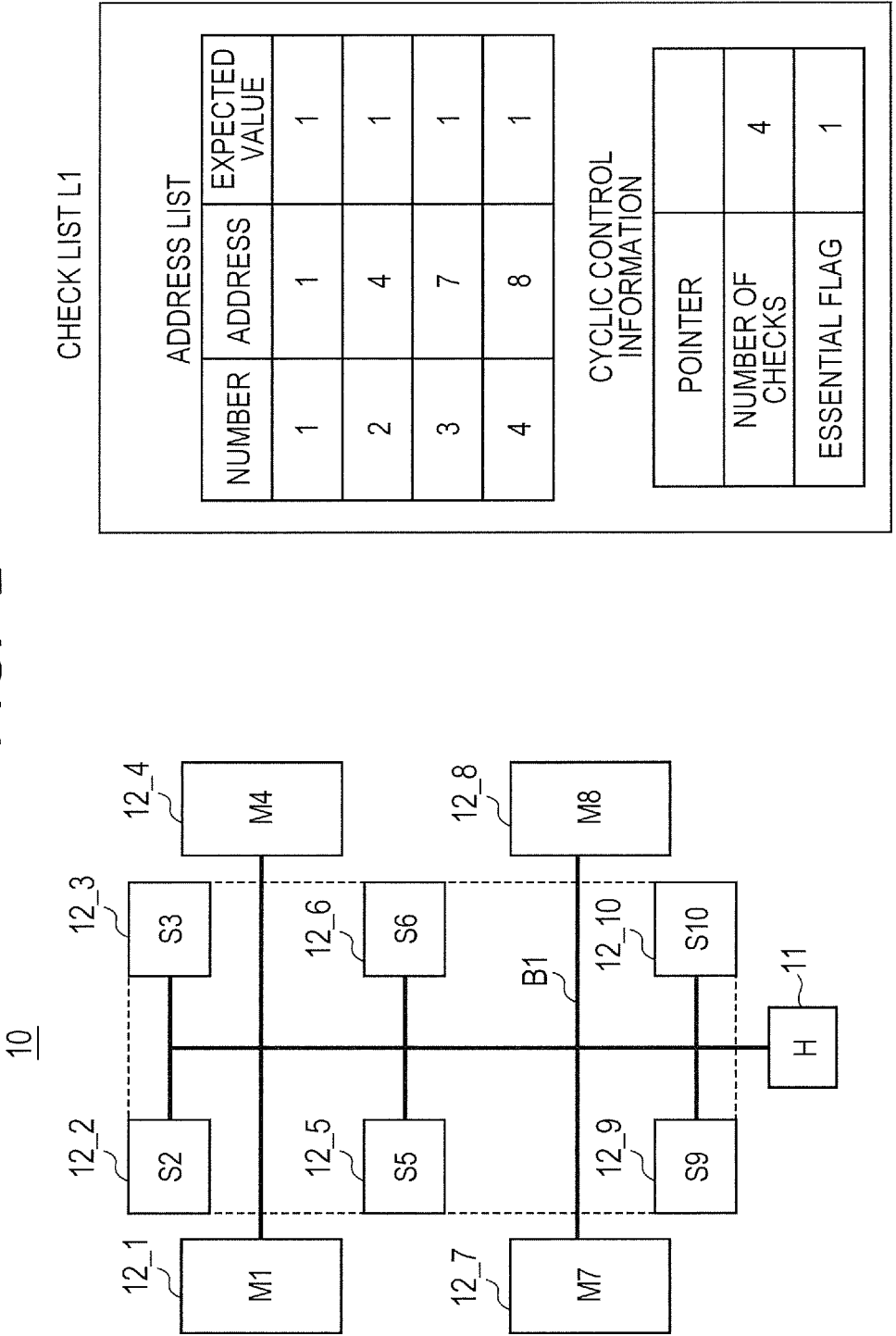
FIG. 2 is a diagram showing a first application example of the semiconductor system shown in FIG. 1 and content of a check list used by the first application example.

FIG. 2 is a diagram showing the first application example of the semiconductor system 1 and content of a check list used by the first application example. In the example of FIG. 2, only the check list L1 is stored in the check list storage unit 114.

As shown in FIG. 2, the semiconductor system 1 is mounted on, for example, a vehicle 10. The semiconductor system 1 mounted on the vehicle 10 includes modules 12_1 to 12_10. In the example of FIG. 2, a case will be described in which the modules 12_1, 12_4, 12_7, and 12_8 are motors which are high priority modules and the modules 12_2, 12_3, 12_5, 12_6, 12_9, and 12_10 are sensors which are low priority modules.

The check list L1 includes at least information of (a) address list, (b) pointer, (c) the number of checks, and (d) essential flag.

(a) Address List

The address list includes information of serial number, address, and expected value.

Here, the address represents an address specifying a module on which a check of whether or not the module is coupled to the communication bus B1 is performed. Hereinafter, an address listed in the address list is also simply referred to as an address to be checked. The serial number represents a sequential order of the check of the addresses to be checked. The expected value represents an expected value of whether or not a module is coupled to the address to be checked. For example, when it is expected that a module is coupled to the address to be checked, 1 is set to the expected value, and when it is expected that no module is coupled to the address to be checked, 0 is set to the expected value.

In the example of FIG. 2, addresses "1, 4, 7, and 8" are set in the address list and an expected value "1" is set to all the addresses. Here, in the example of FIG. 2, the addresses of the modules 12_1 to 12_10 are defined as 1 to 10, respectively. Therefore, in the example of FIG. 2, the motor modules 12_1, 12_4, 12_7, and 12_8 specified by the addresses "1, 4, 7, and 8" are to be checked, and the sensor modules 12_2, 12_3, 12_5, 12_6, 12_9, and 12_10 are not to be checked.

(b) Pointer

The pointer indicates a position to which addresses have been checked among a plurality of addresses listed in the address list and from which the next address check is started. In the example of FIG. 2, the value of the pointer is omitted.

(c) The Number of Checks

The number of checks represents the number of addresses which are continuously checked when addresses included in a corresponding address list are checked. After the addresses, the number of which is the number of checks, have been checked, the process proceeds to the next processing such as performing processing using another address list or performing state confirmation of module control processing.

In the example of FIG. 2, the number of checks is set to "4", so that all of the four addresses "1, 4, 7, and 8" listed in the address list are continuously checked.

(d) Essential Flag

The essential flag indicates whether or not the addresses, the number of which is the number of checks, selected from the addresses listed in the address list are checked in preference to the module control processing for each control period. For example, when the essential flag is set to "1", it means that the check of addresses is more preferential than the module control processing, so that when a control period starts, the check is performed on the addresses, the number of which is the number of checks, before the module control processing. On the other hand, when the essential flag is set to "0", it means that the check of addresses is less preferential than the module control processing, so that the check of addresses, the number of which is the number of checks, is performed only when a spare time occurs in which the module control processing is not performed.

In the example of FIG. 2, the essential flag is set to "1", so that the check of addresses, the number of which is the number of checks (four), is performed before the module control processing when a control period starts.

Timing Chart

Figure 3:
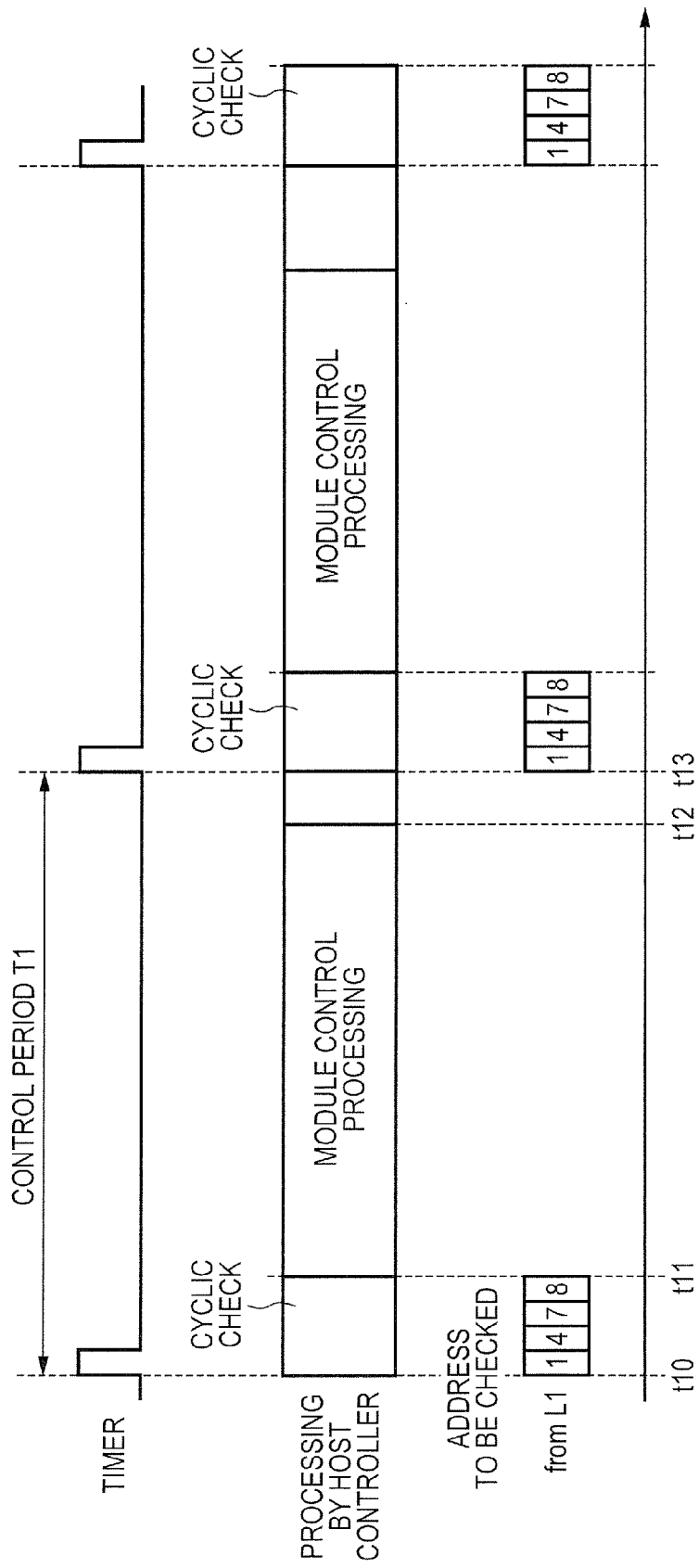
FIG. 3 is a timing chart showing an operation of a semiconductor system using the check list shown in FIG. 2.

FIG. 3 is a timing chart showing an operation of the semiconductor system 1 using the check list L1 shown in FIG. 2. As shown in FIG. 3, a control period T1 is defined by, for example, an interval between the rises of a pulse signal outputted from a timer at a constant period.

First, the control circuit 111 causes the coupling state check circuit 113 to operate when the control period T1 starts (at time t10).

The coupling state check circuit 113 checks the presence or absence of a response from an address to be checked (time t10 to t11) by referring to check lists in which the essential flag is set to "1" from among the check lists L1 to Lm stored in the check list storage unit 114 at the beginning (start) of the control period T1.

In the example of FIG. 3, the essential flag of the check list L1 is set to "1". Therefore, the coupling state check circuit 113 checks the presence or absence of a response from the addresses listed in the check list L1 (time t10 to t11). Thereby, the coupling state between modules specified by the addresses listed in the check list L1 and the communication bus B1 is checked.

Here, in the check list L1, the addresses "1, 4, 7, and 8" are listed in the address list and the number of checks is set to "4". Therefore, the coupling state between the modules 12_1, 12_4, 12_7, and 12_8 specified by the four addresses "1, 4, 7, and 8" listed in the address list and the communication bus B1 is checked (time t10 to t11).

When the check performed by the coupling state check circuit 113 is completed (at time t11), the control circuit 111 is notified accordingly. Thereby, the control circuit 111 causes the coupling state check circuit 113 to stop the check operation and causes the module control circuit 112 to operate (at time t11). Thereby, data communication is performed between the host controller 11 and the modules 12_1 to 12_10 (time t11 to t12). When the data communication is completed (at time t12), the module control circuit 112 becomes stop state until start of the next control period T1 (time t13).

Thereafter, the control circuit 111 starts the next control period T1, stops the data communication performed by the module control circuit 112, and causes the coupling state check circuit 113 to operate (at time t13). Also in the control periods T1 thereafter, the same operation is repeatedly performed.

In this way, in the example of FIG. 2, the host controller 11 checks the coupling state between high priority modules selected based on the information of the check list L1 and the communication bus B1 for each control period. Thereby, the host controller 11 can frequently check high priority modules such as a motor, which requires a quick countermeasure against malfunction, so that the host controller 11 can quickly detect a malfunction of these high priority modules.

Second Application Example of Semiconductor System 1

Subsequently, a second application example of the semiconductor system 1 will be described with reference to FIG. 4. In an example of FIG. 4, while a coupling state between a high priority module and the communication bus B1 is frequently checked, a coupling state between a low priority module and the communication bus B1 is also checked.

Figure 4:
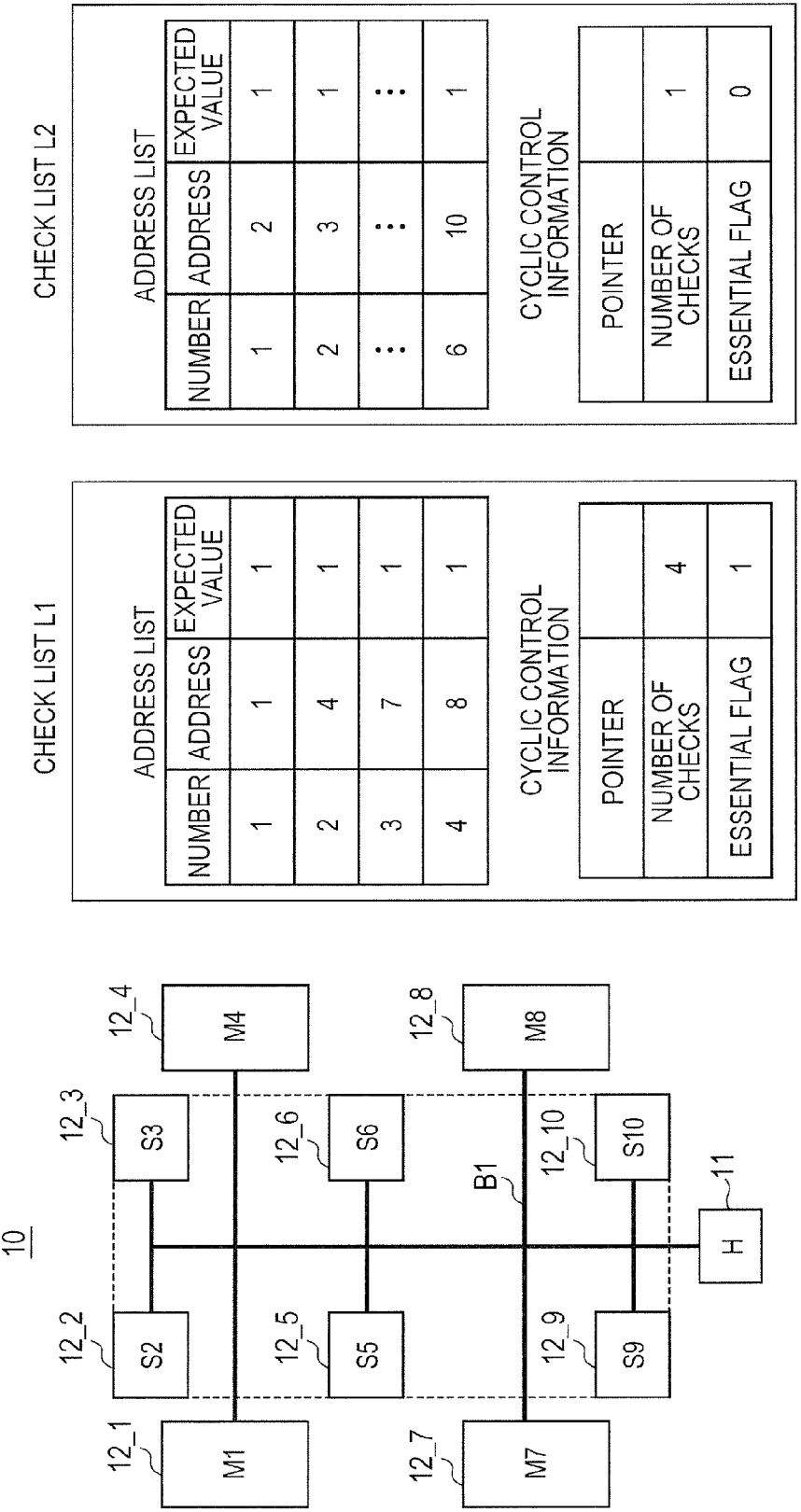
FIG. 4 is a diagram showing a second application example of the semiconductor system shown in FIG. 1 and content of a check list used by the second application example.

FIG. 4 is a diagram showing the second application example of the semiconductor system 1 and content of a check list used by the second application example. In the example of FIG. 4, the check lists L1 and L2 are stored in the check list storage unit 114.

Content of the check list L1 used for the semiconductor system 1 shown in FIG. 4 is the same as that of the check list L1 shown in FIG. 2, so that the description thereof will be omitted. Hereinafter, content of the check list L2 will be mainly described.

A basic structure of the check list L2 is the same as that of the check list L1.

In the example of FIG. 4, addresses "2, 3, 5, 6, 9 and 10" are set in the address list and an expected value "1" is set to all the addresses. Therefore, in the example of FIG. 4, the sensor modules 12_2, 12_3, 12_5, 12_6, 12_9, and 12_10 specified by the addresses "2, 3, 5, 6, 9 and 10" are to be checked, and the motor modules 12_1, 12_4, 12_7 and 12_8 are not to be checked.

In the example of FIG. 4, the essential flag is set to "0", so that the check of addresses is performed only when a spare time occurs in which the module control processing is not performed.

Further, in the example of FIG. 4, the number of checks is set to "1", so that the check is performed on one of the six addresses "2, 3, 5, 6, 9 and 10" listed in the address list. Here, every time the check is performed on one address, a state of the module control processing is confirmed, and when the spare time still remains, the check is performed on the next one address.

Timing Chart

Figure 5:
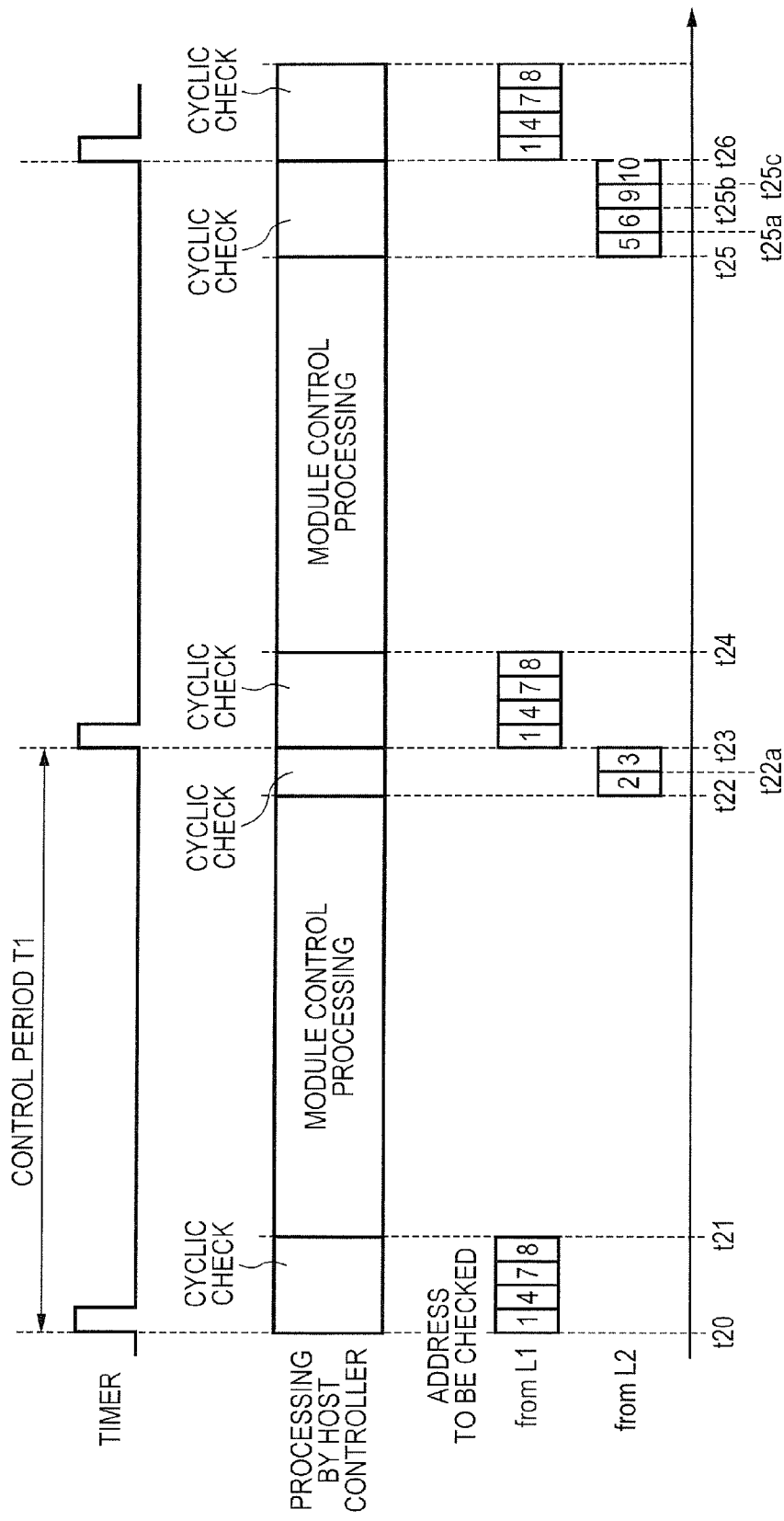
FIG. 5 is a timing chart showing an operation of a semiconductor system using the check list shown in FIG. 4.

FIG. 5 is a timing chart showing an operation of the semiconductor system 1 using the check lists L1 and L2 shown in FIG. 4. As shown in FIG. 5, a control period T1 is defined by, for example, an interval between the rises of a pulse signal outputted from a timer at a constant period.

First, the control circuit 111 causes the coupling state check circuit 113 to operate when the control period T1 starts (at time t20).

The coupling state check circuit 113 checks the presence or absence of a response from an address to be checked (time t20 to t21) by referring to check lists in which the essential flag is set to "1" from among the check lists L1 to Lm stored in the check list storage unit 114 at the beginning of the control period T1.

In the example of FIG. 5, the essential flag of the check list L1 is set to "1". Therefore, the coupling state check circuit 113 checks the presence or absence of a response from the addresses listed in the check list L1 (time t20 to t21). Thereby, the coupling state between modules specified by the addresses listed in the check list L1 and the communication bus B1 is checked.

Here, in the check list L1, the addresses "1, 4, 7, and 8" are listed in the address list and the number of checks is set to "4". Therefore, the coupling state between the modules 12_1, 12_4, 12_7, and 12_8 specified by the four addresses "1, 4, 7, and 8" listed in the address list and the communication bus B1 is checked (time t20 to t21).

When the check performed by the coupling state check circuit 113 is completed (at time t21), the control circuit 111 is notified accordingly. Thereby, the control circuit 111 causes the coupling state check circuit 113 to stop the check operation and causes the module control circuit 112 to operate (at time t21). Thereby, data communication is performed between the host controller 11 and the modules 12_1 to 22_10 (time t21 to t22).

Here, when the data communication is completed before the end (termination) of the control period T1 (at time t22), the control circuit 111 is notified accordingly. Thereby, the control circuit 111 causes the module control circuit 112 to stop the communication operation and causes the coupling state check circuit 113 to operate again (at time t22).

The coupling state check circuit 113 checks the presence or absence of a response from an address to be checked (time t22 to t23) by referring to check lists in which the essential flag is set to "0" from among the check lists L1 to Lm stored in the check list storage unit 114 in a spare time from the completion of the data communication to the end of the control period T1.

In the example of FIG. 5, the essential flag of the check list L2 is set to "0". Therefore, the coupling state check circuit 113 checks the presence or absence of a response from the addresses listed in the check list L2 (time t22 to t23). Thereby, the coupling state between modules specified by the addresses listed in the check list L2 and the communication bus B1 is checked.

Here, in the check list L2, the addresses "2, 3, 5, 6, 9 and 10" are listed in the address list and the number of checks is set to "1". Therefore, the coupling state between the modules 12_2 specified by the address "2" selected first from among the six addresses "2, 3, 5, 6, 9 and 10" listed in the address list and the communication bus B1 is checked (time t22 to t22a).

Even when the check of the address "2" performed by the coupling state check circuit 113 is completed, if the spare time of the control period T1 remains, the coupling state check circuit 113 checks the coupling state between the module 12_3 specified by the next address "3" and the communication bus B1 in the remaining spare time (time t22a to t23).

When the check performed by the coupling state check circuit 113 is completed and the spare time of the control period T1 expires, the control circuit 111 continuously causes the coupling state check circuit 113 to operate when the next control period T1 starts (at time t23).

The coupling state check circuit 113 checks the coupling state between modules 12_1, 12_4, 12_7, and 12_8 specified by the four addresses "1, 4, 7, and 8" listed in the check list L1 and the communication bus B1 (time t23 to t24).

When the check performed by the coupling state check circuit 113 is completed (at time t24), the control circuit 111 is notified accordingly. Thereby, the control circuit 111 causes the coupling state check circuit 113 to stop the check operation and causes the module control circuit 112 to operate (at time t24). Thereby, data communication is performed between the host controller 11 and the modules 12_1 to 12_10 (time t24 to t25).

When the data communication is completed before the end of the control period T1 (at time t25), the control circuit 111 is notified accordingly. Thereby, the control circuit 111 causes the module control circuit 112 to stop the communication operation and causes the coupling state check circuit 113 to operate again (at time t25).

In a spare time from the completion of the data communication to the end of the control period T1, the coupling state check circuit 113 checks the coupling state between the modules 12_5 specified by the address "5" selected next from among the six addresses "2, 3, 5, 6, 9 and 10" listed in the check list L2 and the communication bus B1 (time t25 to t25a).

Even when the check of the address "5" performed by the coupling state check circuit 113 is completed, if the spare time of the control period T1 remains, the coupling state check circuit 113 checks the coupling state between the module 12_6 specified by the next address "6" and the communication bus B1 in the remaining spare time (time t25a to t25b).

Even when the check of the address "6" performed by the coupling state check circuit 113 is completed, if the spare time of the control period T1 remains, the coupling state check circuit 113 checks the coupling state between the module 12_9 specified by the next address "9" and the communication bus B1 in the remaining spare time (time t25b to t25c).

Even when the check of the address "9" performed by the coupling state check circuit 113 is completed, if the spare time of the control period T1 remains, the coupling state check circuit 113 checks the coupling state between the module 12_10 specified by the next address "10" and the communication bus B1 in the remaining spare time (time t25c to t26).

When the check of the address "10" performed by the coupling state check circuit 113 is completed and the spare time of the control period T1 expires, the control circuit 111 continuously causes the coupling state check circuit 113 to operate when the next control period T1 starts (at time t26). Also in the control periods T1 thereafter, the same operation is repeatedly performed.

In this way, in the example of FIG. 4, the host controller 11 does not only check the coupling state between high priority modules selected based on the information of the check list L1 and the communication bus B1 for each control period, but also checks the coupling state between low priority modules selected based on information of the check list L2 and the communication bus B1 in a spare time. Thereby, the host controller 11 can not only frequently check high priority modules, but also can check low priority modules.

Third Application Example of Semiconductor System 1

Subsequently, a third application example of the semiconductor system 1 will be described with reference to FIG. 6. In an example of FIG. 6, while a coupling state between a high priority module and the communication bus B1 is frequently checked, a coupling state between a low priority module and the communication bus B1 is also checked, and further whether or not a new module is coupled to the communication bus B1 is also checked.

Figure 6:
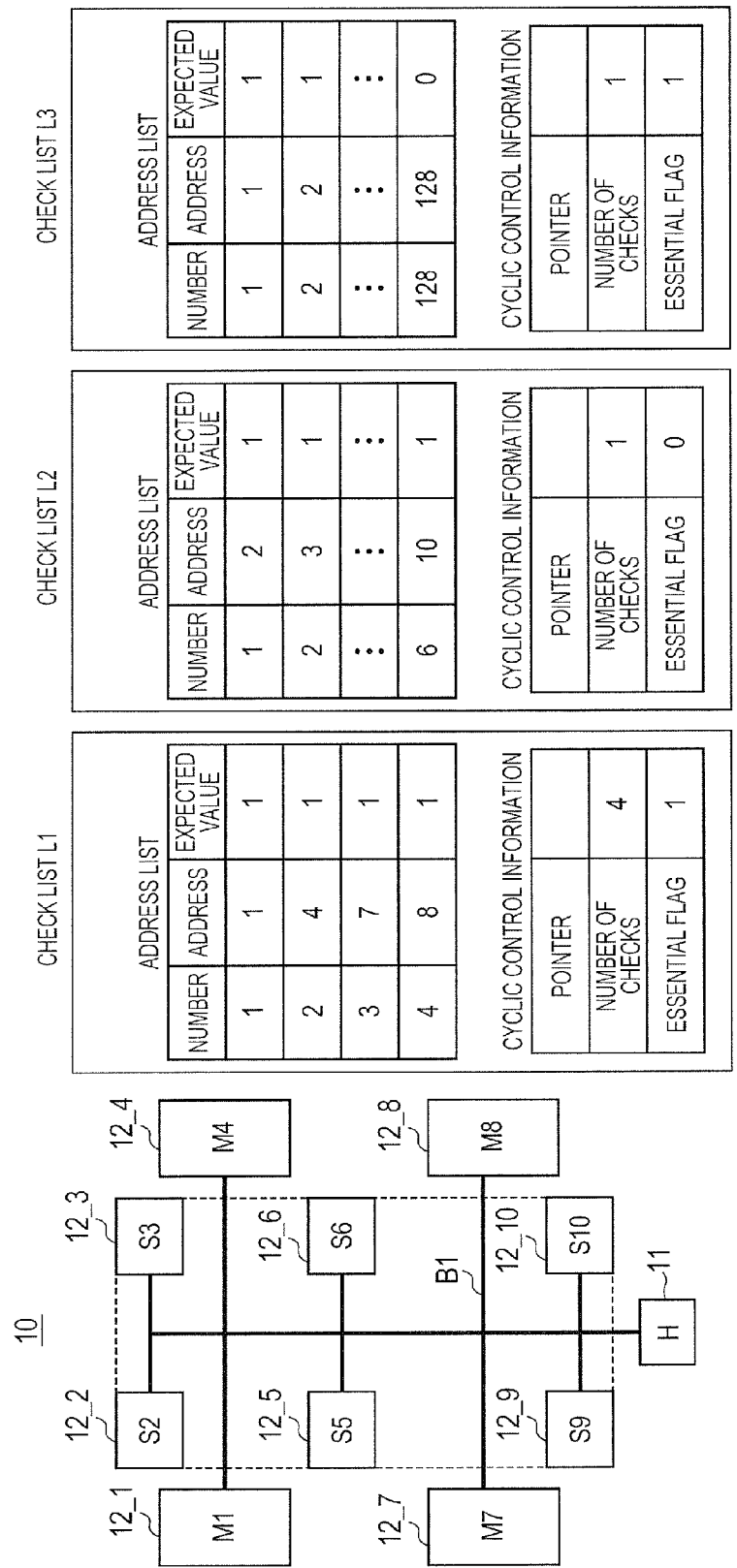
FIG. 6 is a diagram showing a third application example of the semiconductor system shown in FIG. 1 and content of a check list used by the third application example.

FIG. 6 is a diagram showing the third application example of the semiconductor system 1 and content of a check list used by the third application example. In the example of FIG. 6, the check lists L1 to L3 are stored in the check list storage unit 114.

Content of the check lists L1 and L2 used for the semiconductor system 1 shown in FIG. 6 is the same as that of the check lists L1 and L2 shown in FIG. 4, so that the description thereof will be omitted. Hereinafter, content of the check list L3 will be mainly described.

A basic structure of the check list L3 is the same as those of the check lists L1 and L2.

In the example of FIG. 6, all addresses "1 to 128" that can be used in the I2C bus standard are set in the address list. The expected value "1" is set the addresses "1 to 10" to which the modules 12_1 to 12_10 have already been coupled, and the expected value "0" is set the other addresses "11 to 128". In other words, in the check list L3, it is expected that modules have already been coupled to the addresses "1 to 10", respectively, and it is expected that no module is coupled to the addresses "11 to 128".

In the example of FIG. 6, the number of checks is set to "1", so that the check is performed on one address selected from the 128 addresses "1 to 128" listed in the address list. The value of the pointer is omitted.

Further, in the example of FIG. 6, the essential flag is set to "1", so that the check of addresses, the number of which is the number of checks (one), is performed before the module control processing when a control period starts.

When detecting addition of a module, it is necessary to carefully set the number of checks and the value of the essential flag according to the number of all addresses that can be used.

For example, when the essential flag is set to "0", the check of addresses is performed in the spare time described above. Therefore, when the module control processing takes a long time, a state in which there is no spare time continues, so that it is not possible to detect addition of a module for all time. In this case, a user cannot determine whether an added module cannot be detected because the added module is broken or simply because there is no spare time.

Even when the essential flag is set to "1", if the number of checks of address is set to a large value such as "100", the time of the address check occupies almost all of one control period, so that it is not possible to perform the module control processing which is the original purpose.

Further, even when the essential flag is set to "1" and the number of checks of address is set to a small value such as "1", if the number of all addresses that can be used is, for example, 10000, a time corresponding to 10000 control periods is required to perform check on all the addresses. In this case, in the same manner as in the case in which the essential flag is set to "0", it is not possible to detect addition of a module for all time.

In the present embodiment, a case in which the bus standard is the I2C is described as an example, so that the number of addresses that can be used is about 127. Therefore, when the essential is set to "1" and the number of checks of address is set to "1", it is possible to check all the 127 addresses within a range of a practical period of time. For example, when the control period is 10 ms, it is possible to check all the 127 addresses for about 1 s. This period of time is about the same as a period of time from when a USB memory or the like is inserted into a personal computer to when the USB memory is recognized, so it is possible to say that this period of time is within a range of a practical period of time. As described above, it is necessary to set an appropriate value to the number of checks and the value of the essential flag according to the number of all the addresses that can be used.

Timing Chart

Figure 7:
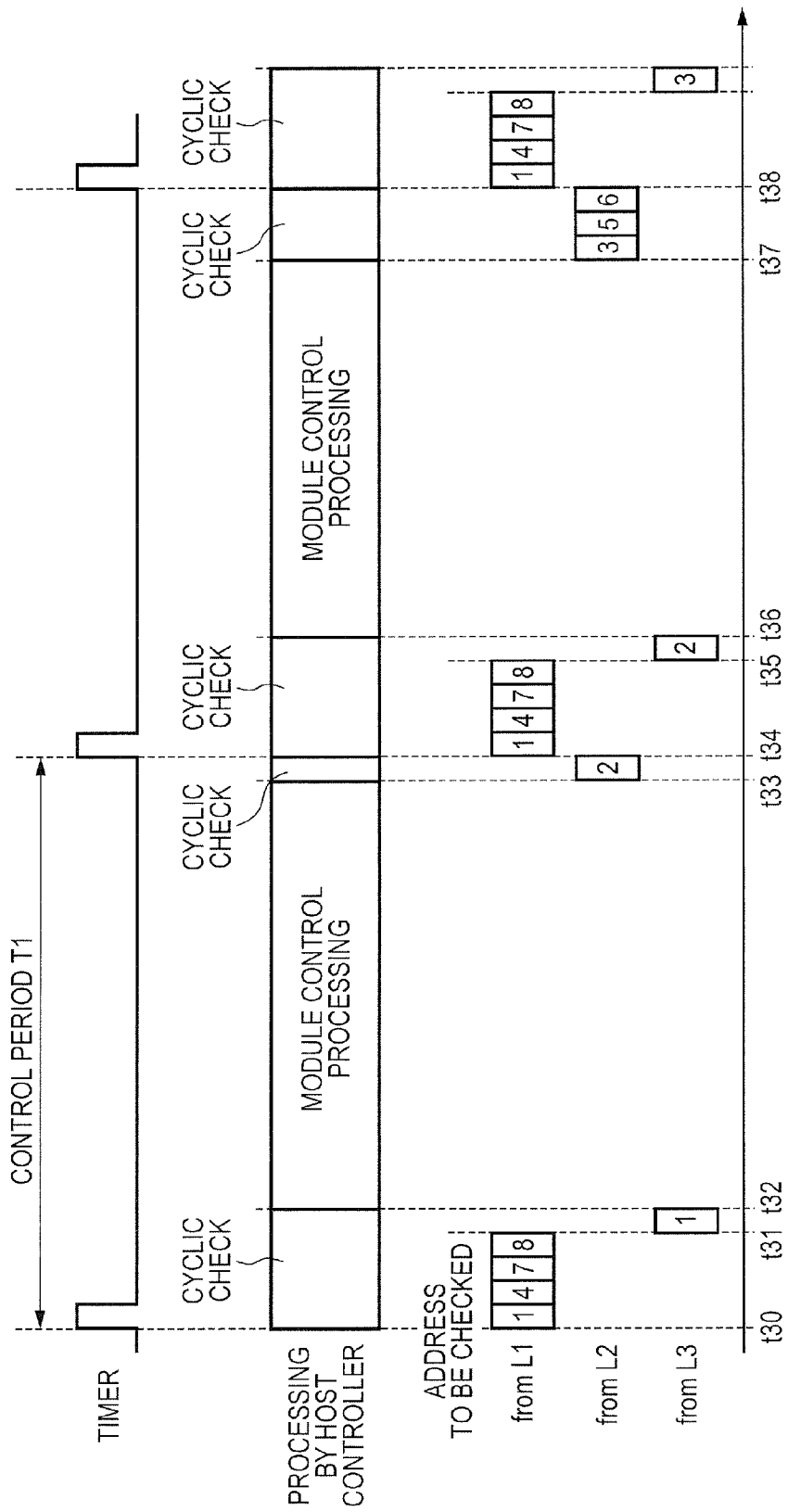
FIG. 7 is a timing chart showing an operation of a semiconductor system using the check list shown in FIG. 6.

FIG. 7 is a timing chart showing an operation of the semiconductor system 1 using the check lists L1 to L3 shown in FIG. 6. As shown in FIG. 7, a control period T1 is defined by, for example, an interval between the rises of a pulse signal outputted from a timer at a constant period.

First, the control circuit 111 causes the coupling state check circuit 113 to operate when the control period T1 starts (at time t30).

The coupling state check circuit 113 checks the presence or absence of a response from an address to be checked (at time t20 to t21) by referring to check lists in which the essential flag is set to "1" from among the check lists L1 to Lm stored in the check list storage unit 114 at the beginning of the control period T1.

In the example of FIG. 7, the essential flag of the check lists L1 and L3 is set to "1". Therefore, the coupling state check circuit 113 checks the presence or absence of a response from the addresses listed in the check lists L1 and L3 (time t30 to t32). Thereby, the coupling state between modules specified by the addresses listed in the check lists L1 and L3 and the communication bus B1 is checked.

Here, in the check list L1, the addresses "1, 4, 7, and 8" are listed in the address list and the number of checks is set to "4". Therefore, the coupling state between the modules 12_1, 12_4, 12_7, and 12_8 specified by the four addresses "1, 4, 7, and 8" listed in the address list and the communication bus B1 is checked (at time t30 to t31).

In the check list L3, the addresses "1 to 128" are listed in the address list and the number of checks is set to "1". Therefore, it is checked whether or not a new module is added to the address "1" selected first from among the 128 addresses "1 to 128" listed in the address list (time t31 to t32). In the example of FIG. 7, the module 12_1 has already been coupled to the address "1", so that it is not detected that a new module is added.

When the check performed by the coupling state check circuit 113 is completed (at time t32), the control circuit 111 is notified accordingly. Thereby, the control circuit 111 causes the coupling state check circuit 113 to stop the check operation and causes the module control circuit 112 to operate (at time t32). Thereby, data communication is performed between the host controller 11 and the modules 12_1 to 12_10 (time t32 to t33).

Here, when the data communication is completed before the end of the control period T1 (at time t33), the control circuit 111 is notified accordingly. Thereby, the control circuit 111 causes the module control circuit 112 to stop the communication operation and causes the coupling state check circuit 113 to operate again (at time t33).

The coupling state check circuit 113 checks the presence or absence of a response from an address to be checked (time t33 to t34) by referring to check lists in which the essential flag is set to "0" from among the check lists L1 to Lm stored in the check list storage unit 114 in a spare time from the completion of the data communication to the end of the control period T1.

In the example of FIG. 7, the essential flag of the check list L2 is set to "0". Therefore, the coupling state check circuit 113 checks the presence or absence of a response from the addresses listed in the check list L2 (time t33 to t34). Thereby, the coupling state between modules specified by the addresses listed in the check list L2 and the communication bus B1 is checked.

Here, in the check list L2, the addresses "2, 3, 5, 6, 9 and 10" are listed in the address list and the number of checks is set to "1". Therefore, the coupling state between the modules 12_2 specified by the address "2" selected first from among the six addresses "2, 3, 5, 6, 9 and 10" listed in the address list and the communication bus B1 is checked (time t33 to t34).

When the check performed by the coupling state check circuit 113 is completed and the spare time of the control period T1 expires, the control circuit 111 continuously causes the coupling state check circuit 113 to operate when the next control period T1 starts (at time t34).

The coupling state check circuit 113 checks the coupling state between modules 12_1, 12_4, 12_7, and 12_8 specified by the four addresses "1, 4, 7, and 8" listed in the check list L1 and the communication bus B1 (time t34 to t35).

Further, the coupling state check circuit 113 checks whether or not a new module is added to the address "2" selected next from among the 128 addresses "1 to 128" listed in the check list L3 (time t35 to t36). In the example of FIG. 7, the module 12_2 has already been coupled to the address "2", so that it is not detected that a new module is added.

When the check performed by the coupling state check circuit 113 is completed (at time t36), the control circuit 111 is notified accordingly. Thereby, the control circuit 111 causes the coupling state check circuit 113 to stop the check operation and causes the module control circuit 112 to operate (at time t36). Thereby, data communication is performed between the host controller 11 and the modules 12_1 to 12_10 (time t36 to t37).

Here, when the data communication is completed before the end of the control period T1 (at time t37), the control circuit 111 is notified accordingly. Thereby, the control circuit 111 causes the module control circuit 112 to stop the communication operation and causes the coupling state check circuit 113 to operate again (at time t37).

The check operation performed by the coupling state check circuit 113 using the check list L2 in the spare time of the control period T1 is as described above, so that the description thereof will be omitted. Also in the control periods T1 thereafter, the same operation is repeatedly performed.

In this way, in the example of FIG. 6, the host controller 11 frequently checks high priority modules and also checks low priority modules, and further can check whether or not a new module is added.

Subsequently, details of the operation of the semiconductor system 1 and a cyclic check operation will be described with reference to a flowchart.

Flowchart Showing Operation of Semiconductor System 1

Figure 8:
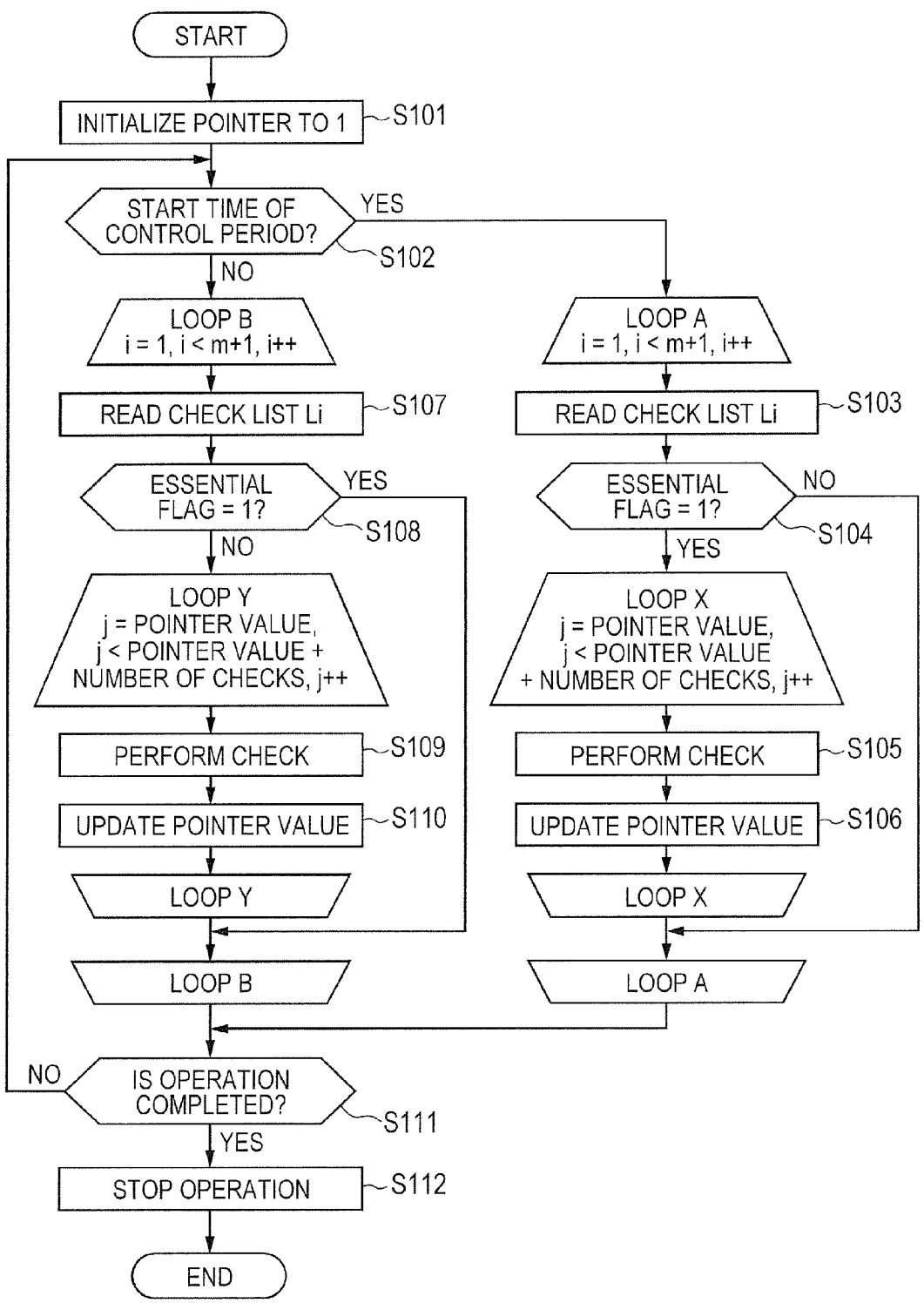
FIG. 8 is a flowchart showing an operation of the semiconductor system according to the first embodiment.

FIG. 8 is a flowchart showing an operation of the semiconductor system 1.

First, the value of each pointer of the check lists L1 to L3 is initialized to "1" (step S101).

Thereafter, when a control period starts (YES in step S102), the process proceeds to loop processing. The loop processing A corresponds to check processing of the coupling state check circuit 113 in the beginning of the control period.

In the loop processing A, the check lists L1 to Lm are read by the coupling state check circuit 113 (step S103). Then, the check is performed on addresses, the number of which is the number of checks, based on information of check lists in which the essential flag is set to "1" among the check lists L1 to Lm (YES in step S104 to step S105). Here, the value of the pointer is added by the number of checks by the loop processing X. In other words, the pointer is updated to a value indicating an address to be checked next time (step S106).

When the loop processing A is completed, for example, data communication (module control processing) is performed by the module control circuit 112.

Thereafter, when the operation of the semiconductor system 1 is completed (YES in step S111), the operation of the semiconductor system 1 is stopped (step S112). On the other hand, when the operation of the semiconductor system 1 is not completed (NO in step S111), the process returns to the determination of whether or not it is the start time of the control period (step S102).

For example, when there is no spare time from the completion of the data communication to the end of the control period, it is the start time of the next control period (YES in step S102), so that the process returns to the loop processing A.

On the other hand, when there is a spare time, it is not the start time of the next control period (NO in step S102), so that the process proceeds to loop processing B. The loop processing B corresponds to check processing of the coupling state check circuit 113 in a spare time from the completion of the data communication to the end of the control period.

In the loop processing B, the check lists L1 to Lm are read by the coupling state check circuit 113 (step S107). Then, the check is performed on addresses, the number of which is the number of checks, based on information of check lists in which the essential flag is set to "0" among the check lists L1 to Lm (NO in step S108 to step S109). Here, the value of the pointer is added by the number of checks by the loop processing Y. In other words, the pointer is updated to a value indicating an address to be checked next time (step S110).

After the completion of the loop processing B, if the operation of the semiconductor system 1 is completed (YES in step S111), the operation of the semiconductor system 1 is stopped (step S112). On the other hand, when the operation of the semiconductor system 1 is not completed (NO in step S111), the process returns to the determination of whether or not it is the start time of the control period (step S102).

For example, when there is no spare time, it is the start time of the next control period (YES in step S102), so that the process proceeds to the loop processing A. On the other hand, when there is a remaining spare time, it is not the start time of the next control period (NO in step S102), so that the process proceeds to the loop processing B. Also in the control periods thereafter, the same operation is repeatedly performed.

Flowchart Showing Details of Cyclic Check Operation by Semiconductor System 1

Figure 9:
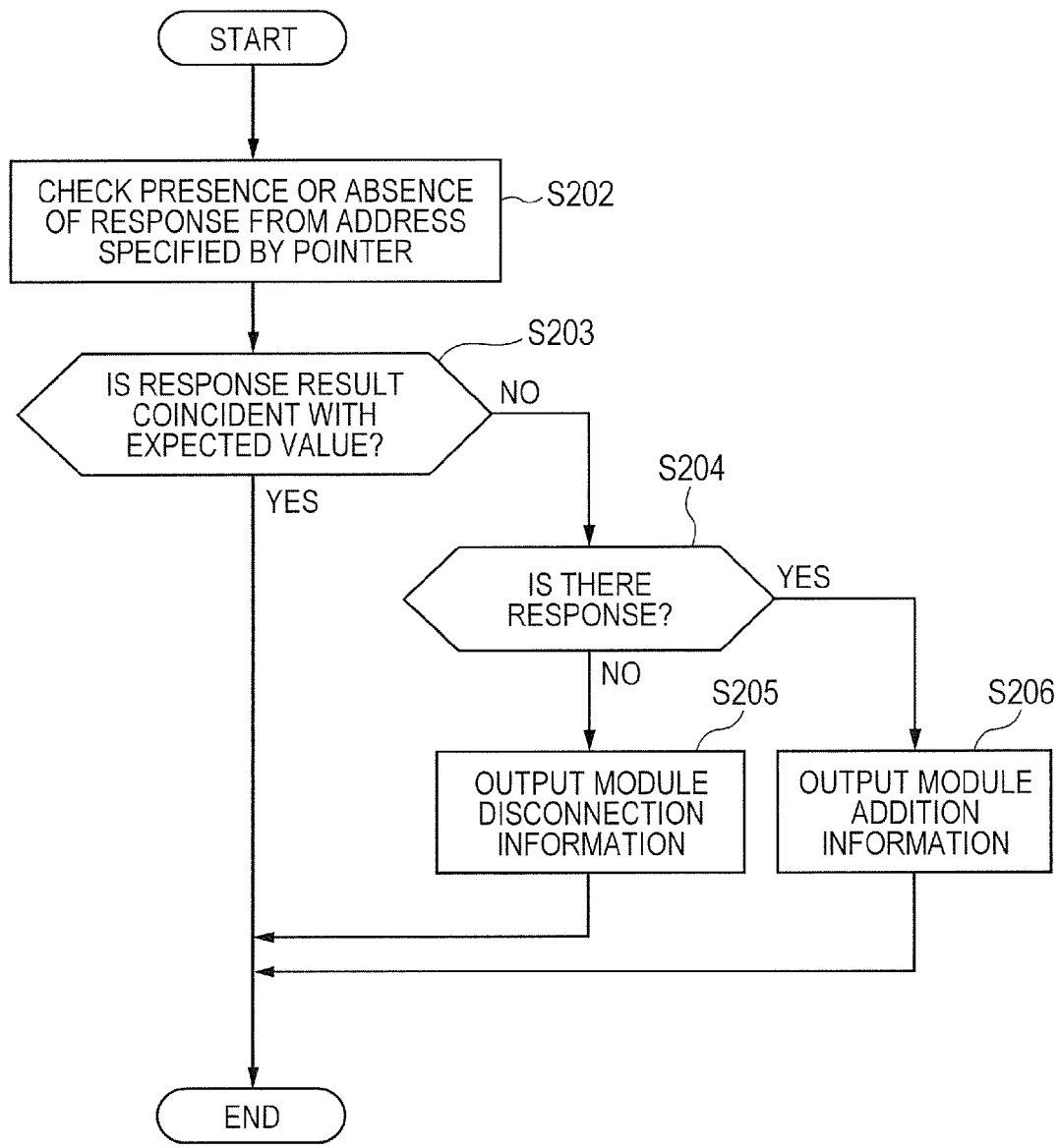
FIG. 9 is a flowchart showing details of a cyclic check operation performed by the semiconductor system according to the first embodiment.

FIG. 9 is a flowchart showing details of the cyclic check operation by the semiconductor system 1.

As shown in FIG. 9, the presence or absence of a response from an address specified by a pointer is checked (step S202). For example, when there is no response from the address specified by the pointer, a value "0" is returned, and when there is a response from the address specified by the pointer, a value "1" is returned.

When a response result is coincident with an expected value (YES in step S203), the coupling state of a module of an address specified by the pointer does not change, so that the check on the address is completed. Thereafter, the process proceeds to, for example, the check of the next address.

On the other hand, when the response result is coincident with the expected value (NO in step S203), information according to the response result is outputted. For example, when the response result indicates "0" (in other words, when there is no response from the address specified by the pointer) (NO in step s204), information indicating that a module supposed to be coupled to the communication bus B1 is disconnected is outputted (step S205). On the other hand, when the response result indicates "1" (in other words, when there is a response from the address specified by the pointer) (YES in step s204), information indicating that a new module is coupled to the communication bus B1 is outputted (step S206).

When the information according to the response result is outputted, the check on the address is completed. Thereafter, the process proceeds to, for example, the check of the next address.

In the present embodiment, a case is described as an example in which the coupling state check circuit 113 checks the coupling state from a module specified by an address to be checked to the communication bus B1 based on the presence or absence of a response from the address to be checked. However, it is not limited to this. For example, the coupling state check circuit 113 may check a temperature, a failure, and the like of a module specified by an address to be checked based on response content (the presence or absence of a response, a response level, a response speed, and the like) from the address to be checked.

In the present embodiment, a case in which at most three checklists L1 to L3 are used is described. However, it is not limited to this, and any number of check lists L1 to Lm may be used. Setting content of each check list L1 to Lm may be appropriately changed without departing from the scope of the embodiment.

Second Embodiment

In the present embodiment, a method of generating the check lists L1 to Lm will be described.

Figure 10:
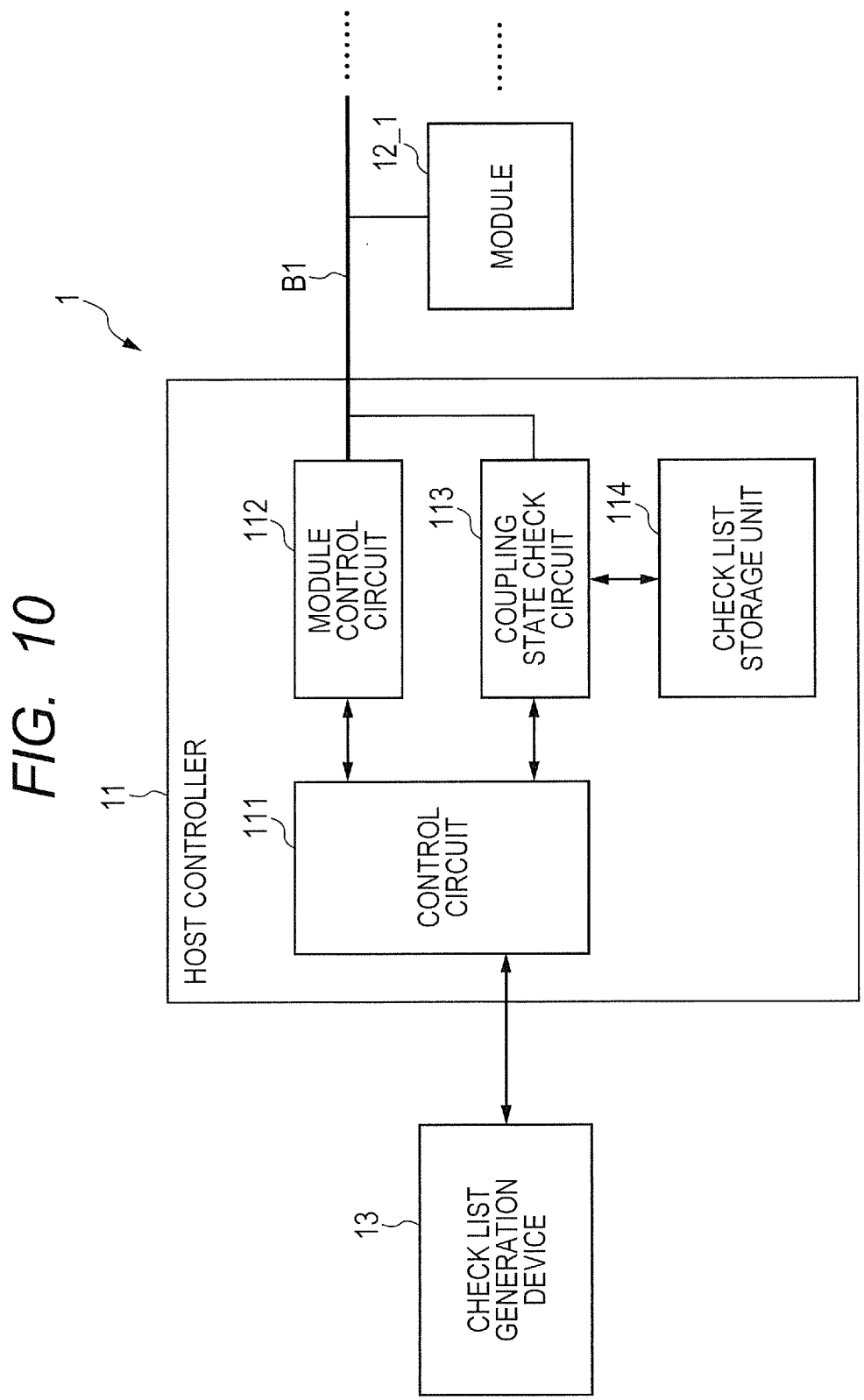
FIG. 10 is a block diagram showing the semiconductor system shown in FIG. 1 and a check list generation device that generates a check list used by the semiconductor system.

FIG. 10 is a block diagram showing the semiconductor system 1 and a check list generation device 13 that generates check lists L1 to Lm used by the semiconductor system 1.

As shown in FIG. 10, for example, the check list generation device 13 transmits and receives data to and from the control circuit 111 provided in the host controller 11 included in the semiconductor system 1.

Specifically, the check list generation device 13 acquires address information of the modules 12_1 to 12_n that have already been coupled to the communication bus B1 from the control circuit 111. Then, the check list generation device 13 generates the check lists L1 to Lm based on the address information (hereinafter referred to as detection address) and information inputted by a user and outputs the check lists L1 to Lm to the control circuit 111. Then, the check lists L1 to Lm are stored in the check list storage unit 114.

Hardware Configuration of Check List Generation Device 13

The check list generation device 13 can be realized by a general-purpose computer system. Hereinafter, a hardware configuration of the check list generation device 13 will be briefly described with reference to FIG. 11.

Figure 11:
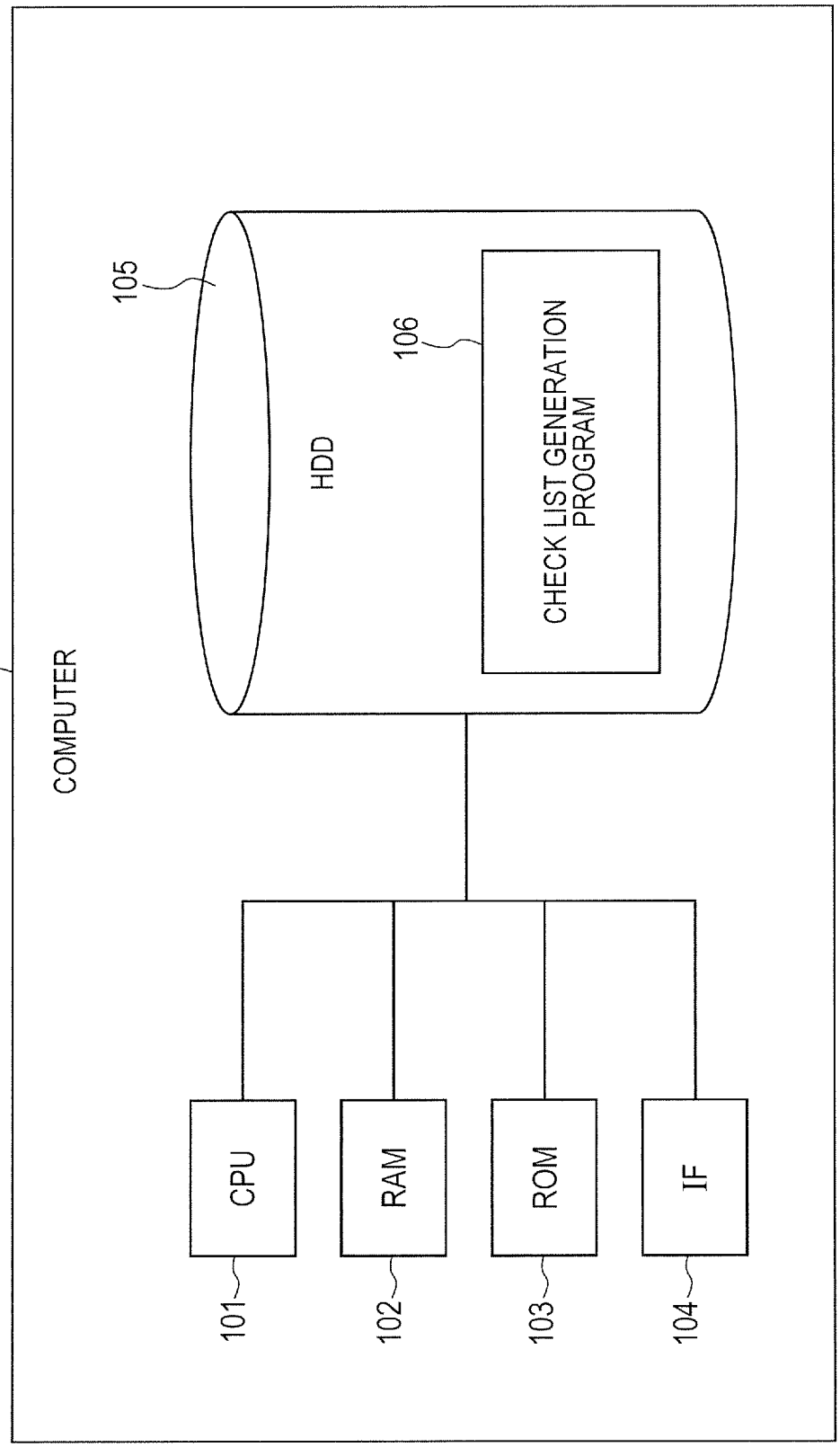
FIG. 11 is a block diagram showing an example of a hardware configuration of the check list generation device.

FIG. 11 is a block diagram showing an example of the hardware configuration of the check list generation device 13. A computer 100 includes, for example, a CPU (Central Processing Unit) 101 which is a control device, a RAM (Random Access Memory) 102, a ROM (Read Only Memory) 103, an interface unit 104 which is an interface with the outside, and an HDD (Hard Disk Drive) 105 which is an example of a non-volatile storage device. Further, the computer 100 may include an input device such as a keyboard and a mouse and a display device such as a display as components not shown in FIG. 11.

The HDD 105 stores OS (Operating System) (not shown in FIG. 11) and a check list generation program 106. The check list generation program 106 is a computer program in which check list generation processing according to the present embodiment is implemented.

The CPU 101 controls various processing operations in the computer 100, access to the RAM 102, the ROM 103, the IF 104, and the HDD 105, and the like. In the computer 100, the CPU 101 reads and executes the OS and the check list generation program 106 which are stored in the HDD 105. Thereby, the computer 100 realizes the check list generation device 13 according to the present embodiment.

Schematic Diagram of Interface Unit 104

Figure 12:
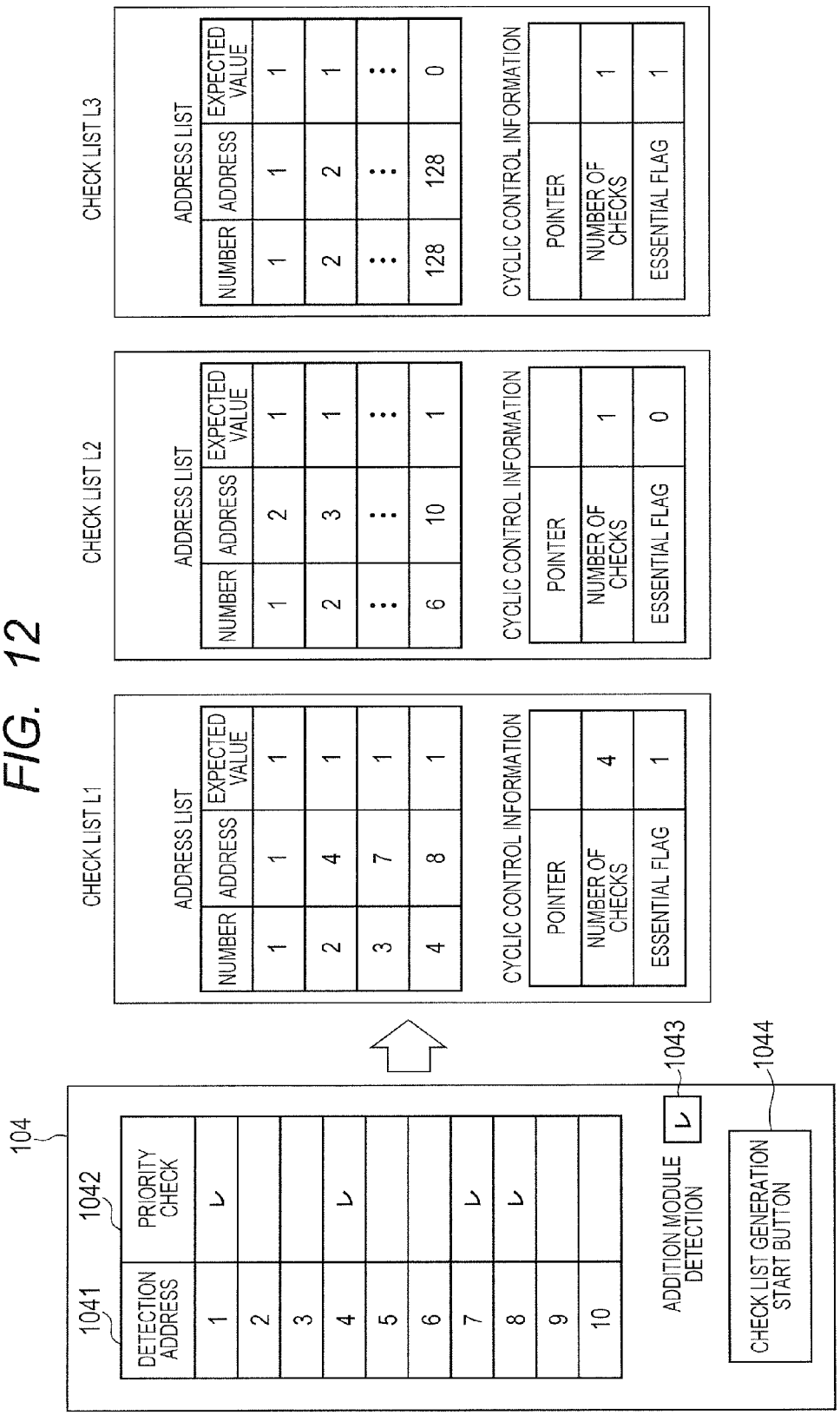
FIG. 12 is a diagram showing an interface unit of the check list generation device shown in FIG. 10 and content of check lists generated by the check list generation device.

FIG. 12 is a diagram showing the interface unit 104 provided in the check list generation device 13 and content of check lists generated by the check list generation device 13. In the example of FIG. 12, a case will be described in which the check lists L1 to L3 are generated by the check list generation device 13. Further, in the example of FIG. 12, in the same manner as in the example of FIG. 6 and the like, a case will be described in which the modules 12_1 to 12_10 are coupled to the communication bus B1.

As shown in FIG. 12, the interface unit 104 transmits information from a user to the inside of the computer system when, for example, the user edits content displayed on a display device by using an input device such as a mouse. In the example of FIG. 12, the display device displays detection address fields 1041, priority check fields 1042 for the detection addresses, an addition module detection field 1043, and a check list generation start button 1044. For example, a user checks the priority check fields 1042 for the addresses "1, 4, 7, and 8" among the detection addresses "1 to 10" (sets the priority checks to "required") and checks the addition module detection field 1043 (sets the addition module detection to "required"). Thereafter, the user clicks the check list generation start button 1044.

As a result, the check list L1 is generated in which the addresses "1, 4, 7, and 8" where the priority check is set to "required" are listed and the essential flag is set to "1". Further, the check list L2 is generated in which the other addresses "2, 3, 5, 6, 9 and 10" are listed and the essential flag is set to "0". Further, the addition module detection is set to "required", so that the check list L3 is generated in which addresses where an addition module is to be detected (here, the addresses 1 to 128) are listed and the essential flag is set to "1".

Flowchart Showing Operation of Check List Generation Device 13

Figure 13:
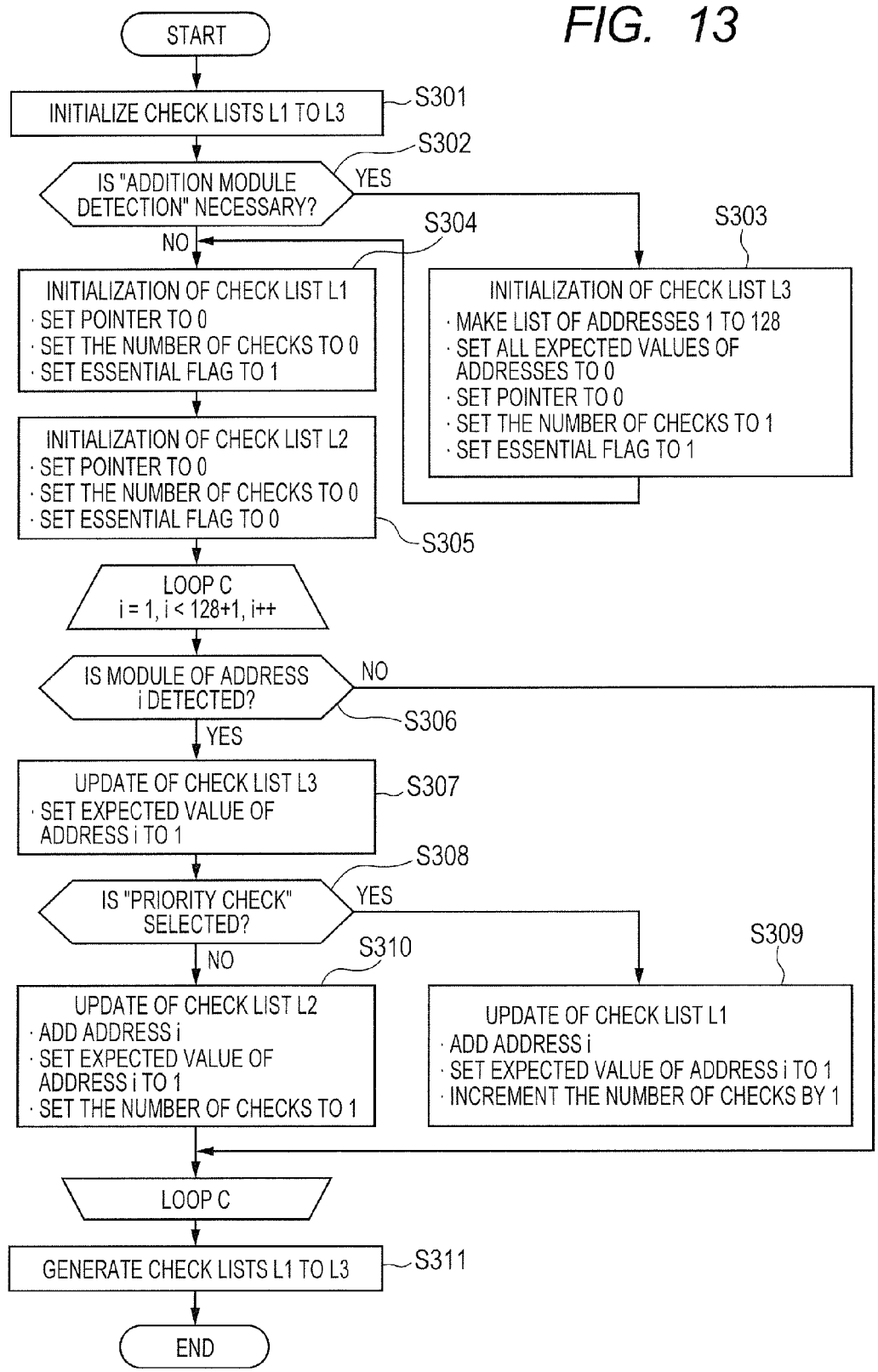
FIG. 13 is a flowchart showing an operation of the check list generation device shown in FIG. 10.

FIG. 13 is a flowchart showing an operation of the check list generation device 13.

First, the check lists L1 to L3 are initialized (step S301). Specifically, each address list of the check lists L1 to L3 is emptied and parameters other than the address list are set to "0".

Thereafter, a determination of whether or not the addition module detection is set to "required" is performed (step S302).

For example, when the addition module detection is set to "required" (YES in step S302), initialization of the check list L3 is performed (step S303). Specifically, the addresses "1 to 128" are added to the address list and all the expected values of the addresses "1 to 128" are set to "0". The value of the pointer is set to "0". The number of checks of address is set to "1". Further, the essential flag is set to "1".

When the addition module detection is not set to "required" (NO in step S302) or when the initialization of the check list L3 is completed (step S303), the initialization of the check list L1 is performed (step S304). Specifically, the value of the pointer is set to "0". The number of checks of address is set to "0". Further, the essential flag is set to "1".

Thereafter, initialization of the check list L2 is performed (step S305). Specifically, the value of the pointer is set to "0". The number of checks of address is set to "0". Further, the essential flag is set to "0".

Thereafter, the process proceeds to loop C processing.

In the loop C processing, first, whether or not a module is coupled to an address "i" (the initial value of i is 1) is checked (step S306).

When a module is coupled to the address "i" (YES in step S306), update of the check list L3 is performed (step S307). Specifically, the expected value of the address "i" (here, i=1) is updated to "1".

When no module is coupled to the address "i" (NO in step S306), the value of i is incremented by 1 without the check lists L1 and L2 being updated, and the process returns to the check of whether or not a module is coupled to the next address "i" (here, i=2) (step S306).

In a case in which a module is coupled to the address "i" (YES in step S306), after the update of the check list L3 is completed (step S307), a determination of whether or not the priority check on the address "i" is set to "required" is performed (step S308).

For example, when the priority check is set to "required" (YES in step S308), update of the check list L1 is performed (step S309). Specifically, the address "i" is added to the address list and the expected value of the address "i" is set to "1". The number of checks of address is incremented by 1 (here, the number of checks is increased from "0" to On the other hand, when the priority check is not set to "required" (NO in step S308), update of the check list L2 is performed (step S310). Specifically, the address "i" is added to the address list and the expected value of the address "i" is set to "1". Further, the number of checks of address is updated to "1".

When the update of the check list L1 or the check list L2 is completed, the value of i is incremented by 1 and the process returns to the check of whether or not a module is coupled to the next address "i" (here, i=2) (step S306).

Hereinafter, the operation of the loop processing C is repeated until i reaches the maximum value of the address (here, 128).

Finally, the check lists L1 to L3 are generated (step S311).

As described above, the check list generation device 13 can easily generate the check lists L1 to Lm by only a simple input operation performed by a user. The check list generation device 13 can be configured to automatically update the priority check fields and the addition module detection field according to the type of detection module. Thereby, it is possible to omit the simple input operation performed by a user.

Third Embodiment

Figure 14:
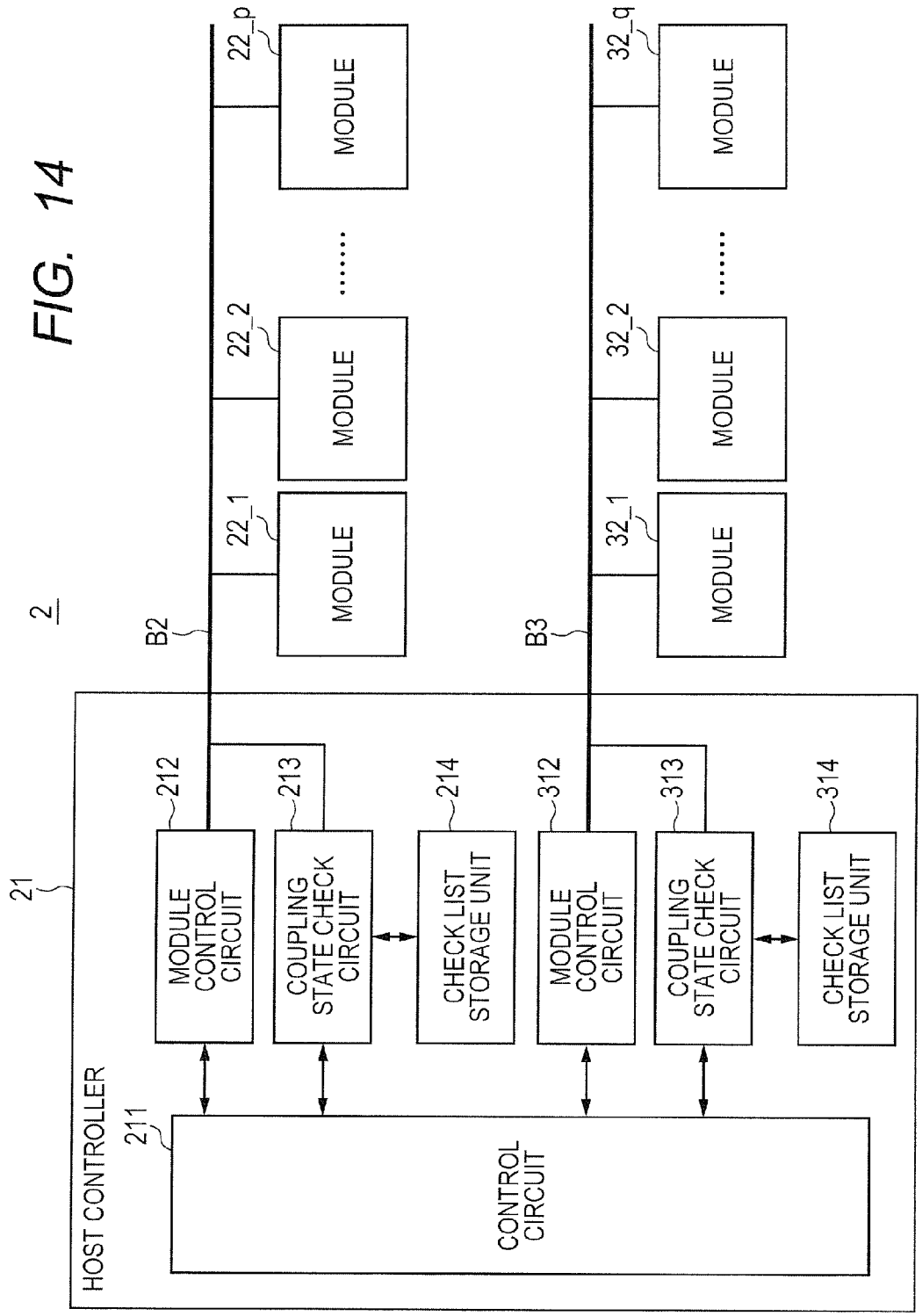
FIG. 14 is a block diagram showing a configuration example of a semiconductor system according to a third embodiment.

FIG. 14 is a block diagram showing a configuration example of a semiconductor system 2 according to a third embodiment. The semiconductor system 2 according to the present embodiment has a cyclic check function in which a host controller 21 independently operates on each of a plurality of communication buses B2 and B3 when the plurality of communication buses B2 and B3 are provided in the semiconductor system 2. Thereby, the semiconductor system 2 can prevent the frequency of the cyclic check from decreasing even when the number of modules to communicate is increased by providing the plurality of communication buses B2 and B3. Hereinafter, the third embodiment will be specifically described.

As shown in FIG. 14, the semiconductor system 2 includes a host controller (a semiconductor device) 21, modules 22_1 to 22_$p$ ($p$ is an integer greater than or equal to 2), modules 32_1 to 32_$q$ ($q$ is an integer greater than or equal to 2), the communication bus B2 that couples the host controller 21 with the modules 22_1 to 22_$p$, and the communication bus B3 that couples the host controller 21 with the modules 32_1 to 32_$q$.

The host controller 21 includes a control circuit 211, module control circuits 212 and 312, coupling state check circuits 213 and 313, and check list storage units 214 and 314. The host controller 21 corresponds to the host controller 11.

The module control circuit 212 is a circuit that performs data communication with the modules 22_1 to 22_p through the communication bus B2. The module control circuit 312 is a circuit that performs data communication with the modules 32_1 to 32_q through the communication bus B3. Each of the module control circuits 212 and 312 corresponds to the module control circuit 112.

The coupling state check circuit 213 determines the priority of check of the coupling states between the modules 22_1 to 22_p and the communication bus B2 based on information of the check lists L1 to Lm stored in the check list storage unit 214 and then checks these coupling states. The coupling state check circuit 213 corresponds to the coupling state check circuit 113.

The coupling state check circuit 313 determines the priority of check of the coupling states between the modules 32_1 to 32_q and the communication bus B3 based on information of the check lists L1 to Lm stored in the check list storage unit 314 and then checks these coupling states. The coupling state check circuit 313 corresponds to the coupling state check circuit 113.

The control circuit 211 is a circuit that selectively causes the module control circuit 212 and the coupling state check circuit 213 to operate and selectively causes the module control circuit 312 and the coupling state check circuit 313 to operate. The control circuit 211 corresponds to the control circuit 111.

In this way, the semiconductor system 2 according to the present embodiment has a cyclic check function in which a host controller 21 independently operates on each of a plurality of communication buses B2 and B3 when the plurality of communication buses B2 and B3 are provided in the semiconductor system 2. Thereby, the semiconductor system 2 can prevent the frequency of the cyclic check from decreasing even when the number of modules to communicate is increased by providing the plurality of communication buses B2 and B3.

In the present embodiment, a case is described as an example in which the coupling state check circuit 213 and 313 check the coupling state from a module specified by an address to be checked to the communication buses B2 and B3 based on the presence or absence of a response from the address to be checked. However, it is not limited to this. For example, the coupling state check circuit 213 and 313 may check a temperature, a failure, and the like of a module specified by an address to be checked based on response content (a response level, a response speed, and the like) from the address to be checked.

While the invention made by the inventors has been specifically described based on the embodiments, it is needless to say that the present invention is not limited to the embodiments described above and may be variously modified without departing from the scope of the invention.

For example, the semiconductor device according to the above embodiments may have a structure in which the conductivity type (p-type or n-type) of a semiconductor substrate, a semiconductor layer, a diffusion layer (a diffusion region), and the like is inverted. Therefore, when one of the n-type and the p-type is defined as a first conductivity type and the other is defined as a second conductivity type, it is possible to define that the first conductivity type is the p-type and the second conductivity type is the n-type, and on the contrary, it is possible to define that the first conductivity type is the n-type and the second conductivity type is the p-type.

What is claimed is:

1. A semiconductor device, comprising:
   a communication circuit that performs data communication with a plurality of externally-provided modules through a bus;
   a check circuit that checks a response content from one or a plurality of first modules which are coupled to the bus and are selected from the externally-provided modules based on information of a first check list; and
   a control circuit that selectively causes the communication circuit and the check circuit to operate,
   wherein, when the control circuit performs the data communication, the control circuit stops checking of a coupling state performed by the check circuit, and when the control circuit performs the checking of the coupling state by using the check circuit, the control circuit stops the data communication.

2. The semiconductor device according to claim 1, wherein the control circuit causes the check circuit to operate and then causes the communication circuit to operate for each control period, and
   wherein the check circuit checks the response content from a predetermined number of first modules sequentially selected from the one or the first modules for each control period.

3. The semiconductor device according to claim 1, further comprising:
   a check list storage unit that stores the first check list.

4. The semiconductor device according to claim 2, wherein, for each control period, the control circuit sequentially causes the check circuit and the communication circuit to operate and then causes the check circuit to operate again if there is a spare time until the control period expires, and
   wherein the check circuit:
   checks the response content from the predetermined number of the first modules at a beginning of the control period; and
   in a spare time until the control period expires, further checks the response content from second modules, a number of which corresponds to the spare time, among one or a plurality of second modules selected from the externally-provided modules based on information of a second check list.

5. The semiconductor device according to claim 4, further comprising:
   a check list storage unit that stores the first and the second check lists.

6. The semiconductor device according to claim 4, wherein the check circuit checks the response content from the predetermined number of the first modules at the beginning of the control period and further checks the response content from addresses sequentially selected based on information of a third check list from among a plurality of addresses that specify modules coupled to the bus.

7. The semiconductor device according to claim 6, further comprising:
   a check list storage unit that stores the first to the third check lists.

8. A semiconductor system, comprising:
   the semiconductor device according to claim 1;
   the plurality of modules; and
   a bus that couples the semiconductor device and each of the modules.

9. A control method of a semiconductor device, the control method comprising:
performing data communication with a plurality of externally-provided modules through a bus by using a communication circuit;
checking a response content from one or the first modules which are coupled to the bus and are selected from the externally-provided modules based on information of a first check list by using a check circuit; and
selectively causing, by a control circuit, the communication circuit and the check circuit to operate,
wherein, when the control circuit performs the data communication, the control circuit stops checking of a coupling state performed by the check circuit, and when the control circuit performs the coupling of the coupling state by using the check circuit, the control circuit stops the data communication.

10. The control method of a semiconductor device according to claim 9, further comprising:
causing the check circuit to operate and then causing the communication circuit to operate for each control period; and
checking the response content from a predetermined number of first modules sequentially selected from the one or the first modules for each control period in the operation of the check circuit.

11. The control method of a semiconductor device according to claim 10, further comprising:
for each control period, sequentially causing the check circuit and the communication circuit to operate and then causing the check circuit to operate again if there is a spare time until the control period expires; and
in an operation of the check circuit:
checking the response content from the predetermined number of the first modules at a beginning of the control period; and
in a spare time until the control period expires, further checking the response content from second modules, a number of which corresponds to the spare time, among one or the second modules selected from the externally-provided modules based on information of a second check list.

12. The control method of a semiconductor device according to claim 11, further comprising:
in the operation of the check circuit, checking the response content from the predetermined number of the first modules at the beginning of the control period and further checking the response content from addresses sequentially selected based on information of a third check list from among the addresses that specify modules coupled to the bus.

13. A check list generation program causing a computer to execute:
processing that detects the modules of claim 1 that are coupled to the bus; and
processing that generates the first check list including information of the one or the first modules where a high priority is set among the modules.

14. The check list generation program according to claim 13, further causing the computer to execute:
processing that generates a second check list including information of the one or the second modules where a low priority is set among the modules.

15. The check list generation program according to claim 14, further causing the computer to execute:
processing that generates a third check list including information of addresses of the bus and information indicating which address of the addresses each of the modules is coupled.

16. A non-transitory computer-readable storage medium encoded with a computer program to control a semiconductor device for:
performing data communication with a plurality of externally-provided modules through a bus by using a communication circuit;
checking a response content from at least one of first modules which are coupled to the bus and are selected from the externally-provided modules based on information of a first check list by using a check circuit; and
selectively causing, by a control circuit, the communication circuit and the check circuit to operate,
wherein, when the control circuit performs the data communication, the control circuit stops checking of a coupling state performed by the check circuit, and when the control circuit performs the checking of the coupling state by using the check circuit, the control circuit stop the data communication.

17. The semiconductor device according to claim 1, wherein the communication circuit is connected to, and communicating with, the bus bar independent of the check circuit.

18. The semiconductor device according to claim 17, wherein the communication circuit is connected to, and communicating with, the control circuit independent of the check circuit.

19. The semiconductor device according to claim 1, wherein the control circuit causes the control circuit and the check circuit to operate exclusively from each other such that the control circuit and the check circuit operate at different time periods.

* * * * *